(12) United States Patent
Volpi et al.

(10) Patent No.: US 12,705,752 B2
(45) Date of Patent: Aug. 11, 2026

(54) SYSTEMS AND METHODS FOR CONTINUOUS ADAPTATION OF SEMANTIC IMAGE SEGMENTATION MODEL

(71) Applicant: NAVER CORPORATION, Gyeonggi-do (KR)

(72) Inventors: Riccardo Volpi, Grenoble (FR); Gabriela Csurka Khedari, Crolles (FR); Diane Larlus, La Tronche (FR)

(73) Assignee: NAVER CORPORATION, Gyeonggi-Do (KR)

( * ) Notice: Subject to any disclaimer, the term of this patent is extended or adjusted under 35 U.S.C. 154(b) by 707 days.

(21) Appl. No.: 18/097,405

(22) Filed: Jan. 16, 2023

(65) Prior Publication Data

US 2024/0242357 A1 Jul. 18, 2024

(51) Int. Cl.
*G06T 7/12* (2017.01)
*G06V 10/82* (2022.01)

(52) U.S. Cl.
CPC ................ *G06T 7/12* (2017.01); *G06V 10/82* (2022.01); *G06T 2207/20084* (2013.01)

(58) Field of Classification Search
CPC .. G06T 7/12; G06T 2207/20084; G06V 10/82
USPC .......................................................... 382/173
See application file for complete search history.

(56) References Cited

U.S. PATENT DOCUMENTS 10,452,978 B2 10/2019 Shazeer et al.

OTHER PUBLICATIONS

Liu, Zhizheng, et al. "Unsupervised Continual Semantic Adaptation through Neural Rendering." arXiv e-prints (2022): arXiv-2211. (Year: 2022).*
Vu, Tuan-Hung, et al. "Advent: Adversarial entropy minimization for domain adaptation in semantic segmentation." Proceedings of the IEEE/CVF conference on computer vision and pattern recognition. 2019. (Year: 2019).*
Yang, Tao, et al. "Test-time batch normalization." arXiv preprint arXiv:2205.10210 (2022). (Year: 2022).*
Xie, Enze, et al. "SegFormer: Simple and efficient design for semantic segmentation with transformers." Advances in neural information processing systems 34 (2021): 12077-12090. (Year: 2021).*

(Continued)

*Primary Examiner* — Jonathan S Lee

(57) ABSTRACT

A semantic image segmentation (SIS) system includes: a neural network module trained to generate semantic image segmentation maps based on input images, the semantic image segmentation maps grouping pixels of the input images under respective class labels, respectively; a minimum entropy module configured to, at a first time, determine first minimum entropies of pixels, respectively, in the semantic image segmentation maps generated for a received image and N images received before the received image, where N is an integer greater than or equal to 1; and an adaptation module configured to selectively adjust parameters of the neural network module based on optimization of a loss function that minimizes the first minimum entropies.

21 Claims, 7 Drawing Sheets
(2 of 7 Drawing Sheet(s) Filed in Color)

(56) References Cited

OTHER PUBLICATIONS

Ashish Vaswani, Noam Shazeer, Niki Parmar, Jakob Uszkoreit, Llion Jones, Aidan N Gomez, Lukasz Kaiser, and Illia Polosukhin. Attention is all you need. In I. Guyon, U. V. Luxburg, S. Bengio, H. Wallach, R. Fergus, S. Vishwanathan, and R. Garnett, editors, Advances in Neural Information Processing Systems 30, pp. 5998-6008. Curran Associates, Inc., 2017.

Chen, L.-C., Papandreou, G., Kokkinos, I., Murphy, K., and Yuille, A. (2017). Deeplab: Semantic Image Segmentation with Deep Convolutional Nets, Atrous Convolution, and Fully Connected CRFs. IEEE Transactions on Pattern Analysis and Machine Intelligence (PAMI), 40(4):834-848.

Hayes, T. and Kanan, C. (2020). Lifelong machine learning with deep streaming linear discriminant analysis. In IEEE Conference on Computer Vision and Pattern Recognition (CVPR), Workshops.

Hayes, T., Cahill, N. D., and Kanan, C. (2019). Memory efficient experience replay for streaming learning. In International Conference on Robotics and Automation (ICRA).

Hayes, T., Kafle, K., Shrestha, R., Acharya, M., and Kanan, C. (2020). Remind your neural network to prevent catastrophic forgetting. In European Conference on Computer Vision (ECCV).

Parisi, G., Kemker, R., Part, J., Kanan, C., and Wermter, S. (2019). Continual Lifelong Learning with Neural Networks: A Review. Neural Networks, 113:57-71.

Riccardo Volpi, Dlane Larlus, Gabriela Csurka: "Entropy minimization strategies over a Buffer of samples for continual adaptation over a stream of unlabeled samples." Jul. 2022.

Richter, S., Vineet, V., Roth, S., and Vladlen, K. (2016). Playing for Data: Ground Truth from Computer Games. In European Conference on Computer Vision (ECCV).

Ros, G., Sellart, L., Materzynska, J., Vazquez, D., and Lopez, A. (2016). The SYNTHIA Dataset: a Large Collection of Synthetic Images for Semantic Segmentation of Urban Scenes. In IEEE Conference on Computer Vision and Pattern Recognition (CVPR).

Sakaridis, C., Dai, D., and Van Gool, L. (2021). ACDC: The Adverse Conditions Dataset with Correspondences for Semantic Driving Scene Understanding. arXiv:2104.13395.

Schneider, S., Rusak, E., Eck, L., Bringmann, O., Brendel, W., and Bethge, M. (2020). Improving robustness against common corruptions by covariate shift adaptation. In Neural Information Processing Systems (NeurIPS).

Sun, Y., Wang, X., Liu, Z., Miller, J., Efros, A., and Hardt, M. (2020). Test-time training with self-supervision for generalization under distribution shifts. In International Conference on Machine Learning (ICML).

Volpi, R., de Jorge, P., Larlus, D., and Csurka, G. (2022). On the road to online adaptation for semantic image segmentation. In IEEE Conference on Computer Vision and Pattern Recognition (CVPR).

Wang, D., Shelhamer, E., Liu, S., Olshausen, B., and Darrell, T. (2021). Tent: Fully test-time adaptation by entropy minimization. In International Conference on Learning Representations (ICLR).

Zhang, M., Levine, S., and Finn, C. (2021). Memo: Test time robustness via adaptation and augmentation. arXiv:2110.09506.

Zhao, H., Shi, J., Qi, X., Wang, X., and Jia, J. (2017). Pyramid Scene Parsing Network. In IEEE Conference on Computer Vision and Pattern Recognition (CVPR).

Zhou, B., Zhao, H., Puig, X., Fidler, S., Barriuso, A., and Torralba, A. (2017). Scene parsing through ade20k dataset. In IEEE Conference on Computer Vision and Pattern Recognition (CVPR).

* cited by examiner

SYSTEMS AND METHODS FOR CONTINUOUS ADAPTATION OF SEMANTIC IMAGE SEGMENTATION MODEL

FIELD

The present disclosure relates to semantic image segmentation models and more particularly to systems and methods for continuously adapting semantic image segmentation models using a stream of unlabeled samples.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are one type of robot and are an example of an autonomous system that is mobile and may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants/humans from a pickup to a destination. Another example of a navigating robot is a robot used to perform one or more functions inside a residential space (e.g., a home).

Other types of robots are also available, such as residential robots configured to perform various domestic tasks, such as putting liquid in a cup, filling a coffee machine, etc.

SUMMARY

In a feature, a semantic image segmentation (SIS) system includes: a neural network module trained to generate semantic image segmentation maps based on input images, the semantic image segmentation maps grouping pixels of the input images under respective class labels, respectively; a minimum entropy module configured to, at a first time, determine first minimum entropies of pixels, respectively, in the semantic image segmentation maps generated for a received image and N images received before the received image, where N is an integer greater than or equal to 1; and an adaptation module configured to selectively adjust parameters of the neural network module based on optimization of a loss function that minimizes the first minimum entropies.

In further features, the adaptation module is configured to adjust batch norm parameters of the neural network module based on the optimization of a loss function that minimizes the first minimum entropies.

In further features, the batch norm parameters include $\beta$ and $\gamma$ of each layer of the neural network module.

In further features, the neural network module includes a ResNet-50 convolutional neural network.

In further features, the neural network module includes a visual network having the Transformer architecture.

In further features, a buffer module is configured to store the N images received before the received image.

In further features, the received image and the N images received before the received image are captured consecutively in time.

In further features, the received image and the N images received before the received image are captured non-consecutively in time.

In further features: the minimum entropy module is configured to, at a second time after the first time, determine second minimum entropies of the pixels, respectively, in the semantic image segmentation maps generated for a second received image and N images received before the second received image; and the adaptation module is configured to selectively adjust the parameters of the neural network module based on the second minimum entropies.

In further features, the received image, the second received image, and the N images form a continuous video stream.

In further features, the neural network module is further configured to, after the adjustment of the parameters, determine a semantic image segmentation map based on the received image.

In a feature, a robot includes: a camera; the SIS system where the received image is captured using the camera; and a control module configured to actuate an actuator of the robot based on one of the semantic image segmentation maps from the neural network module.

In further features, the neural network module is configured to receive the received image from a camera.

In further features, the neural network module is configured to receive the received image from a video stored in memory.

In a feature, a semantic image segmentation (SIS) method includes: by a neural network module, generating semantic image segmentation maps based on input images, the semantic image segmentation maps grouping pixels of the input images under respective class labels, respectively; at a first time, determining first minimum entropies of pixels, respectively, in the semantic image segmentation maps generated for a received image and N images received before the received image, where N is an integer greater than or equal to 1; and selectively adjusting parameters of the neural network module based on optimization of a loss function that minimizes the first minimum entropies.

In further features, the selectively adjusting includes adjusting batch norm parameters of the neural network module based on the optimization of a loss function that minimizes the first minimum entropies.

In further features, the batch norm parameters include $\beta$ and $\gamma$ of each layer of the neural network module.

In further features, the neural network module includes one of: a ResNet-50 convolutional neural network; and a visual network having the Transformer architecture.

In further features, the SIS method further includes storing the N images received before the received image in a buffer module.

In further features, one of: the received image and the N images received before the received image are captured consecutively in time; and the received image and the N images received before the received image are captured non-consecutively in time.

In a feature, a semantic image segmentation (SIS) method includes: by a neural network module, generating semantic image segmentation maps based on input images that group pixels of the input images under respective class labels, respectively; at a first time, determining first minimum entropies of pixels, respectively, in the semantic image segmentation maps generated for a received image and N images received before the received image, where N is an integer greater than or equal to 1; and selectively adjusting the respective class labels of the semantic image segmentation map of the received image based on a function that minimizes the first minimum entropies of the pixels.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

A robot may include a camera. Images from the camera and measurements from other sensors of the robot can be used to control actuation of the robot, such as propulsion, actuation of one or more arms, and/or actuation of a gripper.

Some types of robots may determine a segmentation mask of an object in an image and its class (name) using a semantic image segmentation (SIS) model. The SIS model is trained using images including objects of predetermined classes.

The present application involves continual and unsupervised domain adaptation of the SIS model. The concepts described herein improve adaptability of systems that are used for robotics tasks, such as computer vision based navigation. A buffer of the most recently received images is used for minimizing entropy and adjusting the parameters of the SIS model. Increasing entropy indicates less certainty in predicted output values. Minimizing the entropy of the output when values are too high will make the model drift. This issue is overcome by minimizing entropy of segmentation maps (which groups pixels of an input image under respective class labels) for the buffered images across the temporal dimension and only minimizing the entropy of these predictions while disregarding others. More specifically, the drifting issue may be solved by minimizing the entropy of the prediction with lowest entropy across the temporal buffer (i.e., the prediction with the lowest entropy is more certain than other predictions with higher entropy).

Figure 1:
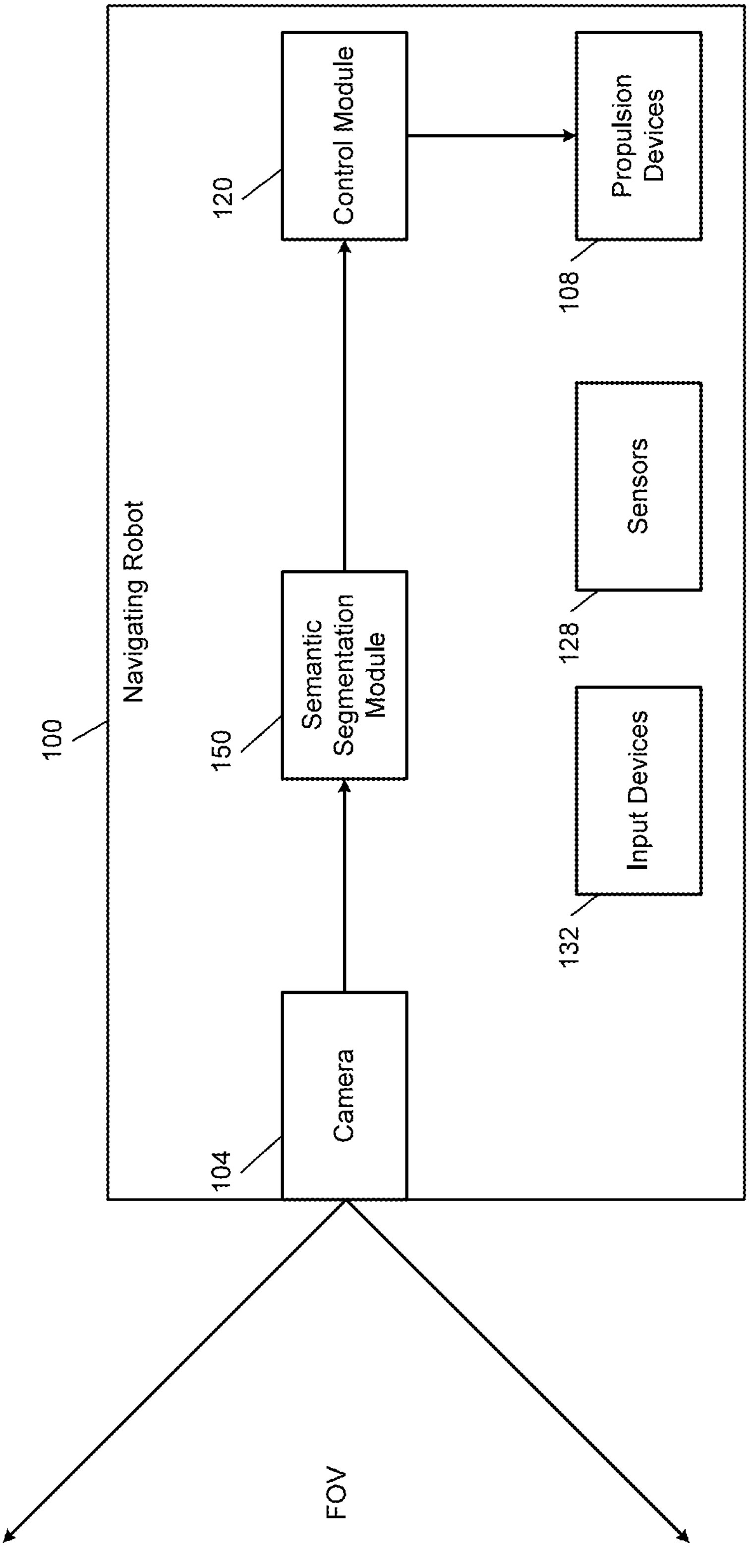
FIGS. 1 and 2 are functional block diagrams of example robots.

FIG. 1 is a functional block diagram of an example implementation of a navigating robot 100. The navigating robot 100 is a vehicle and is mobile. The navigating robot 100 includes a camera 104 that captures images within a predetermined field of view (FOV). The predetermined FOV may be less than or equal to 360 degrees around the navigating robot 100. The operating environment of the navigating robot 100 may be an indoor space (e.g., a building), an outdoor space, or both indoor and outdoor spaces.

The camera 104 may be, for example, a grayscale camera, a red, green, blue (RGB) camera, or another suitable type of camera. The camera 104 may or may not capture depth (D) information, such as in the example of a grayscale-D camera or a RGB-D camera. The camera 104 may be fixed to the navigating robot 100 such that the orientation of the camera 104 (and the FOV) relative to the navigating robot 100 remains constant. The camera 104 may update (capture images) at a predetermined frequency, such as 60 hertz (Hz), 120 Hz, or another suitable frequency.

A semantic segmentation module 150 segments objects in the images in the camera. Segmenting objects is different than object detection in that object detection involves identifying boundary boxes around the objects in images. Segmentation involves identifying the pixels that bound an object within an image.

The navigating robot 100 may include one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly. The robot 100 is powered, such as via an internal battery and/or via an external power source, such as wirelessly (e.g., inductively).

While the example of a navigating robot is provided, the present application is also applicable to other types of robots with a camera.

Figure 2:
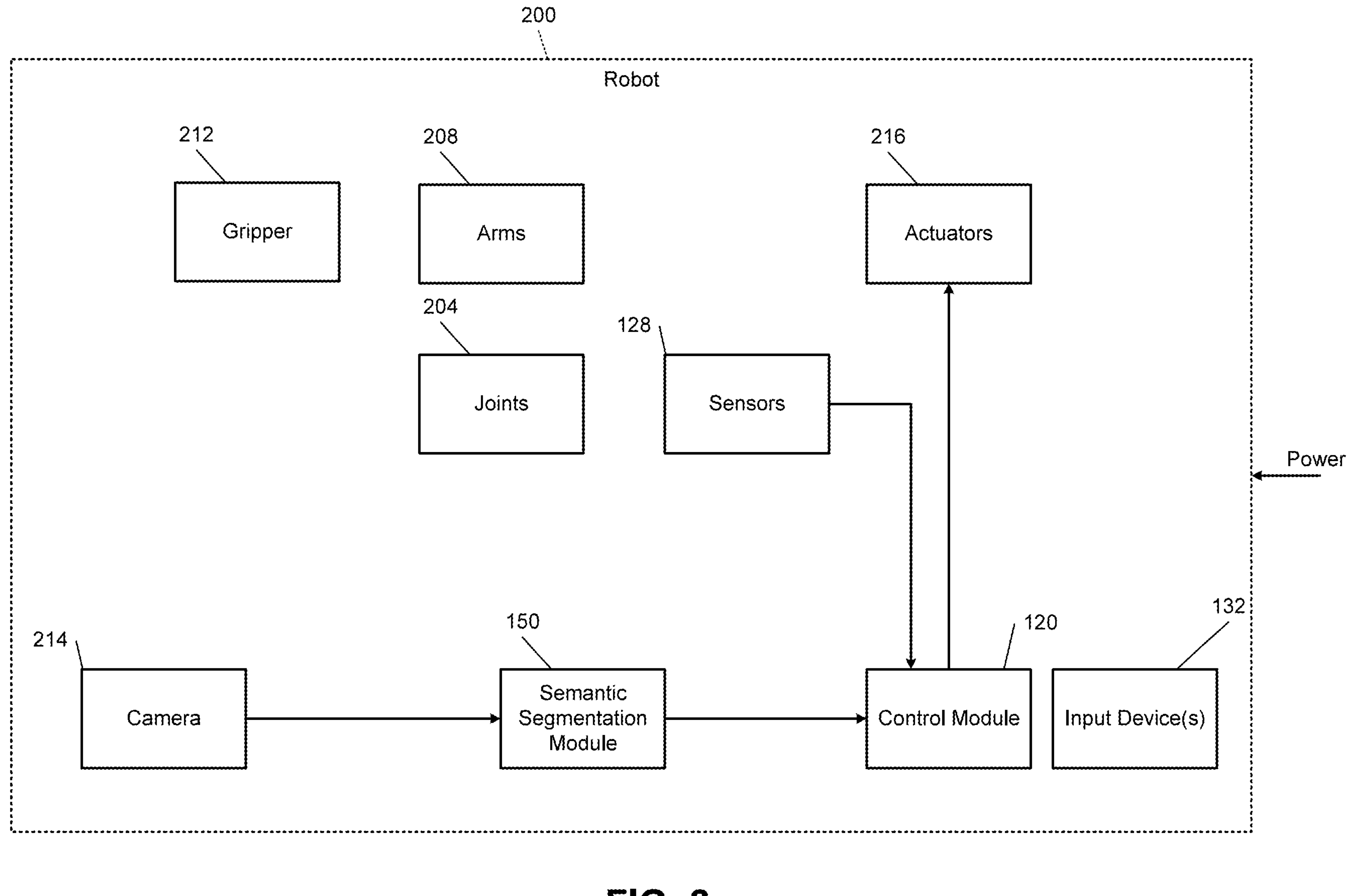

For example, FIG. 2 includes a functional block diagram of an example robot 200. The robot 200 may be stationary or mobile. The robot 200 may be, for example, a 5 degree of freedom (DoF) robot, a 6 DoF robot, a 7 DoF robot, an 8 DoF robot, or have another number of degrees of freedom. In various implementations, the robot 200 may include the Panda Robotic Arm by Franka Emika, the mini Cheetah robot, or another suitable type of robot.

The robot 200 is powered, such as via an internal battery and/or via an external power source, such as alternating current (AC) power. AC power may be received via an outlet, a direct connection, etc. In various implementations, the robot 200 may receive power wirelessly, such as inductively.

The robot 200 includes a plurality of joints 204 and arms 208. Each arm may be connected between two joints. Each joint may introduce a degree of freedom of movement of a (multi fingered) gripper 212 of the robot 200. The robot 200 includes actuators 216 that actuate the arms 208 and the gripper 212. The actuators 216 may include, for example, electric motors and other types of actuation devices.

In the example of FIG. 1, a control module 120 controls actuation of the propulsion devices 108. In the example of FIG. 2, the control module 120 controls the actuators 216 and therefore the actuation (movement, articulation, actuation of the gripper 212, etc.) of the robot 200. The control module 120 may include a planner module configured to plan movement of the robot 200 to perform one or more different tasks. An example of a task includes moving to and grasping and moving an object. The present application, however, is also applicable to other tasks, such as navigating from a first location to a second location while avoiding objects and other tasks. The control module 120 may, for example, control the application of power to the actuators 216 to control actuation and movement. Actuation of the actuators 216, actuation of the gripper 212, and actuation of the propulsion devices 108 will generally be referred to as actuation of the robot.

The robot 200 also includes a camera 214 that captures images within a predetermined field of view (FOV). The predetermined FOV may be less than or equal to 360 degrees around the robot 200. The operating environment of the robot 200 may be an indoor space (e.g., a building), an outdoor space, or both indoor and outdoor spaces.

The camera 214 may be, for example, a grayscale camera, a red, green, blue (RGB) camera, or another suitable type of camera. The camera 214 may or may not capture depth (D) information, such as in the example of a grayscale-D camera or a RGB-D camera. The camera 214 may be fixed to the robot 200 such that the orientation of the camera 214 (and the FOV) relative to the robot 200 remains constant. The camera 214 may update (capture images) at a predetermined frequency, such as 60 hertz (Hz), 120 Hz, or another suitable frequency.

The control module 120 controls actuation of the robot based on one or more images from the camera, such as the objects segmented in the images. The control module 120 may control actuation additionally or alternatively based on measurements from one or more sensors 128 and/or one or more input devices 132. Examples of sensors include position sensors, temperature sensors, location sensors, light sensors, rain sensors, force sensors, torque sensors, etc. Examples of input devices include touchscreen displays, joysticks, trackballs, pointer devices (e.g., mouse), keyboards, steering wheels, pedals, and/or one or more other suitable types of input devices.

Figure 3:
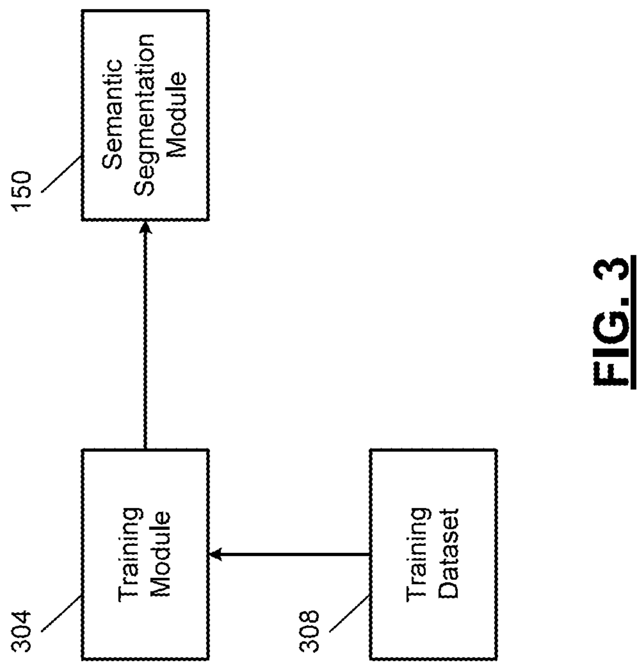
FIG. 3 includes a functional block diagram of an example training system.
Figure 4:
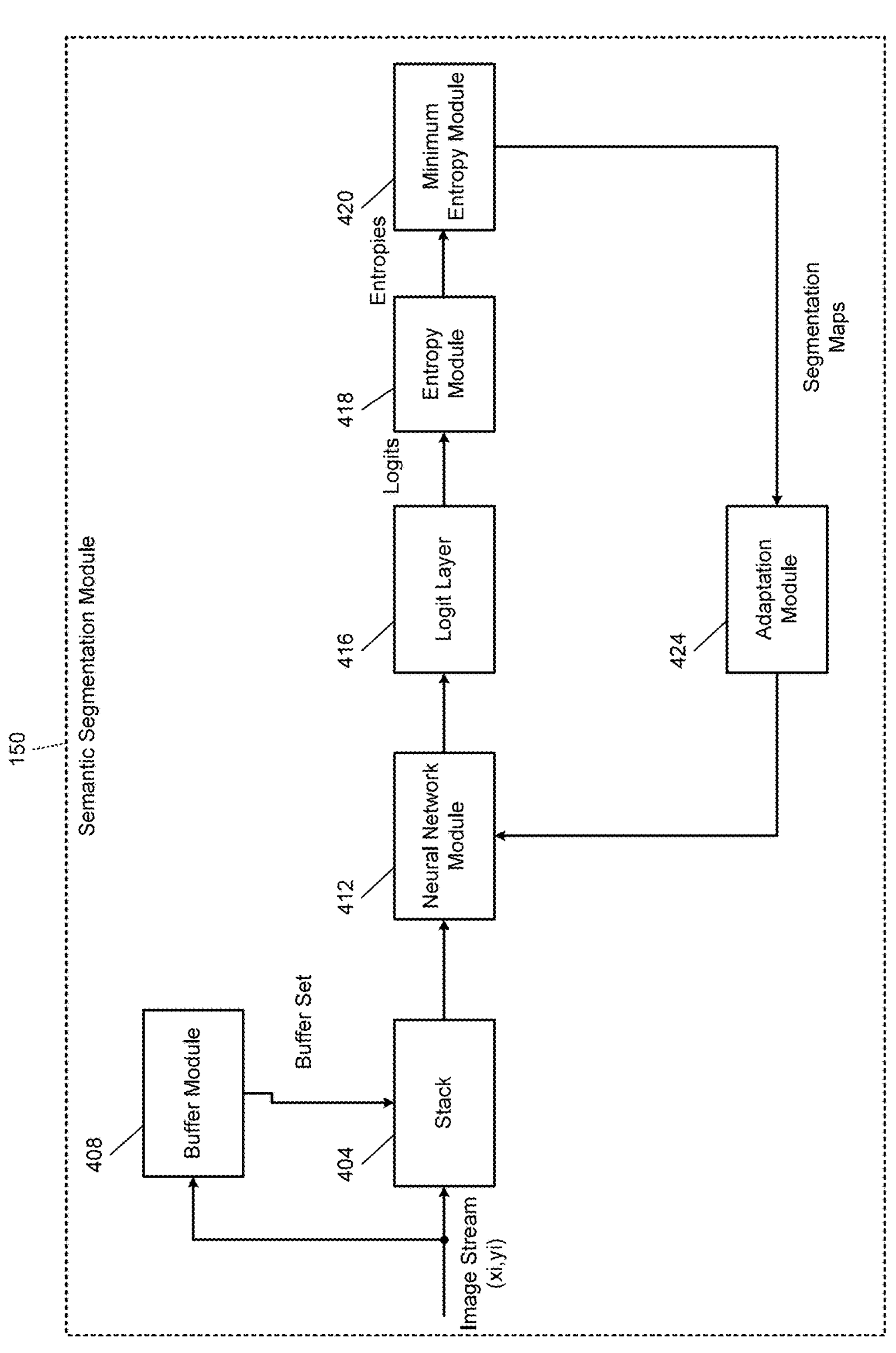
FIGS. 4-5 are functional block diagrams of an example implementation of a semantic segmentation module.

FIG. 3 is a functional block diagram of an example training system. FIG. 4 is a functional block diagram including an example implementation of the semantic segmentation module 150 processing a continuous stream of images. A training module 304 trains the semantic segmentation module 150 using a training dataset 308. Stated generally, the training module 304 first trains the semantic segmentation module 150 to perform semantic segmentation of objects in images of predetermined classes (labels). The training module 304 first trains the semantic segmentation module 150 using images including objects of the predetermined classes and pixel level annotations for the objects in the images. The pixel level annotations include pixels defining the outer boundaries of the objects in the images.

After the training, the semantic segmentation module 150 adapts itself continuously using a buffer of recent samples to select only reliable predictions for entropy minimization. To select most reliable predictions, for each pixel location the semantic segmentation module may select the prediction with minimum entropy across the temporal dimension or using another suitable block grouping. This yields a more resilient online adaptation solution than minimizing the entropy of a pretrained model for each given sample minimizing a loss with respect to all entropy values without any considerations about their reliability.

Referring now to FIG. 4, the semantic segmentation module 150 includes a stack 404, a buffer module 408, a neural network module 412, a logit layer 416, a minimum entropy module 420, and an adaptation module 424. The stack 404 provides a concatenation of a most recently received image and one or more images stored in the buffer module 408 (buffer set) to the neural network module 412.

Let $$(x_t)_{t=1}^{M}$$

refer to a stream of unlabeled images. Let $M_\theta$ be the be the neural network module 412 parameterized by θ. This may be referred to as a source (segmentation) model. The neural network module 412 may include, for example, the ResNet-50 convolutional neural network, another type of convolutional neural network, or another type of neural network, for example a visual transformer model having the Transformer architecture. The transformer architecture is described in U.S. Pat. No. 10,452,978, which is incorporated herein in its entirety. The transformer architecture is also described in Ashish Vaswani, Noam Shazeer, Niki Parmar, Jakob Uszkoreit, Llion Jones, Aidan N Gomez, Łukasz Kaiser, and Illia Polosukhin, “Attention is all you need”, In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. While the example of the images being a video stream from a camera of a robot is provided, the present application is also applicable to other video, such as video stored in memory and video received from another device (e.g., a remote server or camera). Also, the images used may not necessarily be taken consecutively in time. The present application is also applicable to a buffer of images taken at non-consecutive times.

The neural network module 412 receives images $x \in \mathcal{R}^{C \times W \times H}$ and output segmentation maps $s \in \mathcal{R}^{C \times W \times H}$ for the images, respectively, where C is the number of semantic classes that the neural network module 412 is trained to recognize and (W,H) corresponds to the size (Width and Height) of an input image. The logit layer 416 determines logits in the segmentation maps (in an example, the logits may be normalized or non-normalized (e.g., raw) values for semantic class predictions). The buffer module 408 stores and outputs the last predetermined number of the images $$(\{x_{i-j}, y_{i-j}\})_{j-1}^{T}.$$

The segmentation maps include with predictions of semantic classes, predictions of entropies of the pixels, respectively. The minimum entropy module 420 determines one or more minimum entropies of the pixels in segmentation maps for the images and creates a segmentation map including the pixels with the minimum entropies. Determining the minimum entropies involves the minimum entropy module 420 identifying, for a pixel location, the entropies of each segmentation map for that pixel. The minimum entropy module 420 determines the minimum (smallest) one of these entropies and uses that entropy as the minimum entropy for that pixel location. The minimum entropy module 420 does this for each pixel to create a segmentation map including the minimum entropy for each pixel.

The adaptation module 424 selectively adapts (e.g., adjusts) one or more parameters of the neural network module 412 based on minimizing the entropy of the segmentation maps generated by the neural network module 412. The adaptation module 424 selectively adapts the one or more parameters using an adaptation algorithm.

At each time step t, the adaptation module 424 (using the adaptation algorithm) generates a refined segmentation map starting from the output of the neural network module 412 $M_\theta$. At each time step t, the following may be performed by the semantic segmentation module 150.

1. An unlabeled image $x_t$ is received in the data stream, such as from the camera 104 or 214.
2. Based on the image, the neural network module 412 $M_{\theta t-1}$ generates/predicts a segmentation map $\hat{s}=M_{\theta t-1}(x_t)$.
3. The adaptation module 424 adapts the model parameters $\theta t=\mathcal{A}(\hat{s}, M_{\theta t-1})$ based on minimizing the entropy of the pixels of the segmentation map and updates the neural network module 412 $M_{\theta t-1}:=M_{\theta t}$ with the adapted parameters.
4. Optionally, the updated/adapted neural network module 412 generates/predicts an updated segmentation map $\tilde{s}=M_{\theta t}(x_t)$.

In various implementations, the adaptation module 424 may adapt the batch norm (BN) parameters β and γ of each layer I $$\left(\beta = \{\beta_l\}_{l=1}^{L},\ \gamma = \{\gamma_l\}_{l=1}^{L}\right)$$

of the neural network module 412. In various implementations, the adaptation module 424 may adapt only the BN parameters β and γ of each layer I of the neural network module 412 and maintain fixed all of the other parameters of the neural network module 412.

The adaptation module 424 could adapt the one or more parameters using the equation:

$$\underset{\beta,\gamma}{\operatorname{argmin}}\ \mathcal{L}_H := \frac{1}{|x|}\sum\nolimits_{p\in x}\left(-\sum\nolimits_{c\in C}\hat{y}_{t,c}^{p}\log\hat{y}_{t,c}^{p}\right) \tag{1}$$

without the temporal buffer nor selection mechanisms.

The role of the BN parameters β and γ is to re-scale the feature normalized with respect to training statistics after each layer, such as follows:

$$\hat{f}_l = \gamma_l \cdot \frac{f_l - u_l}{\sigma_l^2} + \beta_l, \tag{2}$$

where $f_l$ is a feature vector output from the l-th layer of the neural network module 412, $u_l$ and $\sigma_l$ are the training statistics (values) of the l-th layer, and $\beta_l$ and $\gamma_l$ are parameters determined using equation (1) above.

The buffer module 408 includes the last N images input to the neural network module 412, where N is an integer greater than or equal to 2. As discussed above, the neural network module 412 generates a segmentation map for each of the N images and the input image. For each pixel in the segmentation maps, the minimum entropy module 420 selects only the one of the segmentation maps having the minimum entropy.

An entropy module 428 determines the entropies of the pixels, respectively, based on the logits. For example, the entropy module 428 may determine the entropy of a pixel of a segmentation map using the equation:

$$e_{i,j} = -\sum_{i} p_{i,j}^{k}\log p_{i,j}^{k}$$

Figure 5:
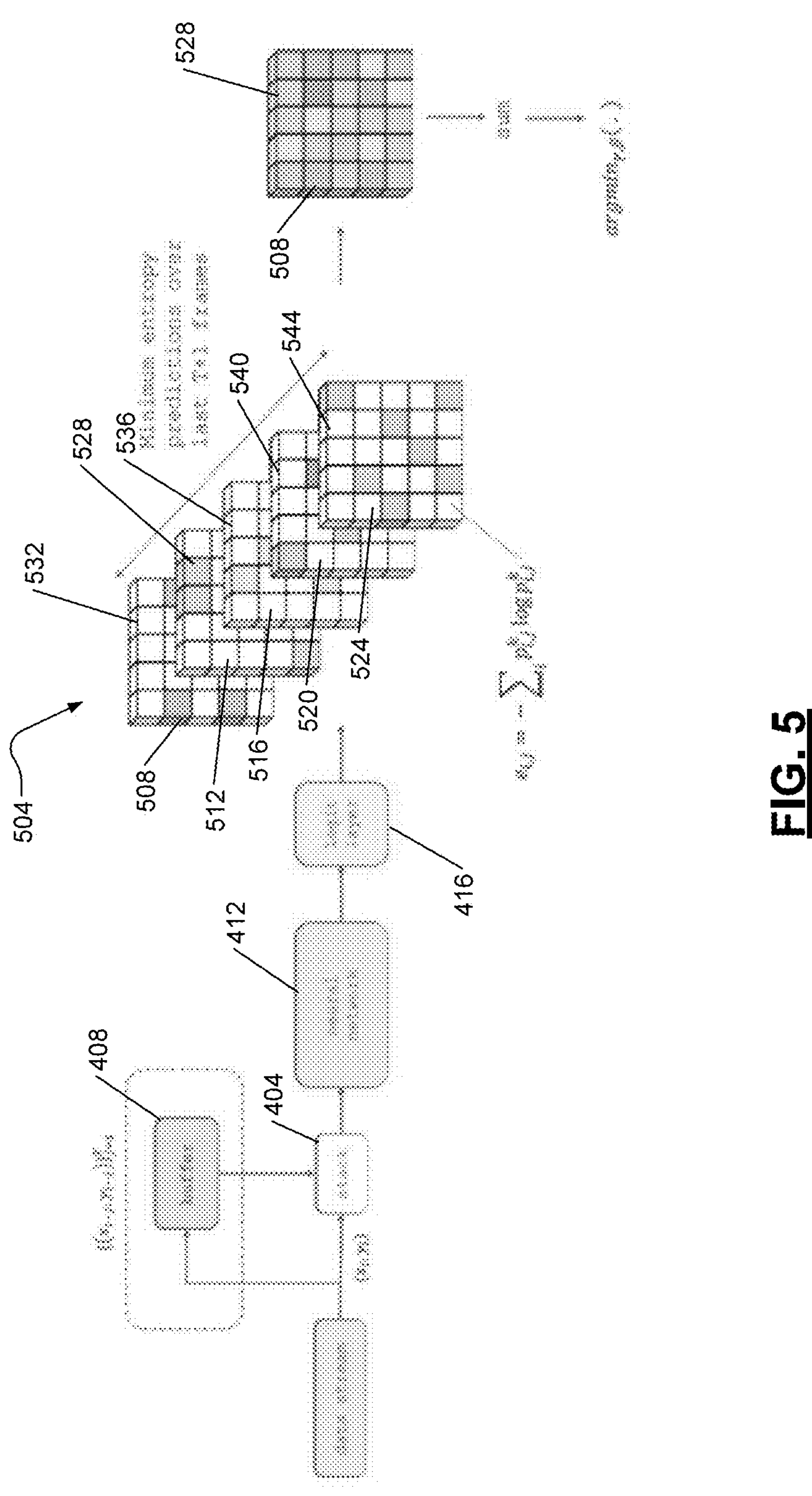

FIG. 5 is a functional block diagram of an example implementation of the semantic segmentation module 150. Example segmentation maps for the input images, respectively, are illustrated by 504. Each square of each segmentation map represents a pixel. In the example of FIG. 5, the entropy of pixel 508 is less than the entropies of that same pixel 512-524 of the other segmentation maps. Thus, the entropy 508 is used as the minimum entropy for that pixel location. Similarly, the entropy of pixel 528 is less than the entropies of that same pixel 532-544 of the other segmentation maps. Thus, the entropy 528 is used as the minimum entropy for the pixel.

For the N images and the input image, the adaptation module 424 may adapt the one or more parameters using the equation:

$$\underset{\beta,\gamma}{\operatorname{argmin}}\ \mathcal{L}_H := \frac{1}{|x|}\sum\nolimits_{p\in x}\min_{n}\left\{-\sum\nolimits_{c\in C}\hat{y}_{t,c}^{p}\log\hat{y}_{t,c}^{p}\right\} \tag{3}$$

The minimum entropy predictions across the temporal dimension (n) of each pixel is selected by the minimum entropy module 420 and used for the adaptation of the neural network module 412. For the N images and the input image, the adaptation module 424 may adapt the one or more parameters using the equation:

$$\underset{\beta,\gamma}{\operatorname{argmin}}\ \mathcal{L}_H := \frac{1}{|x|\cdot N}\sum\nolimits_{k=0}^{N-1}\sum\nolimits_{p\in x}\left\{-\sum\nolimits_{c\in C}\hat{y}_{t,c}^{p}\log\hat{y}_{t,c}^{p}\right\} \tag{4}$$

In various implementations, the minimum entropy module 420 may average the entropy over the buffer of samples. The above may provide a baseline for the use of a temporal buffer module without a specific selection type.

Generally speaking, a model and a buffer may be included. The model is adapted continuously as images are received, such as by optimizing equation (3) above. A minimum operation may be performed over pixel predictions associated with each sample from the buffer. The pixel predictions may be selected in equation (3) with an arbitrary decision rule, such as a given uncertainty metric. The features described herein provide improved segmentation than other image segmentation algorithms in new environments upon which the model was not trained and may improve navigation of a robot.

Figure 6:
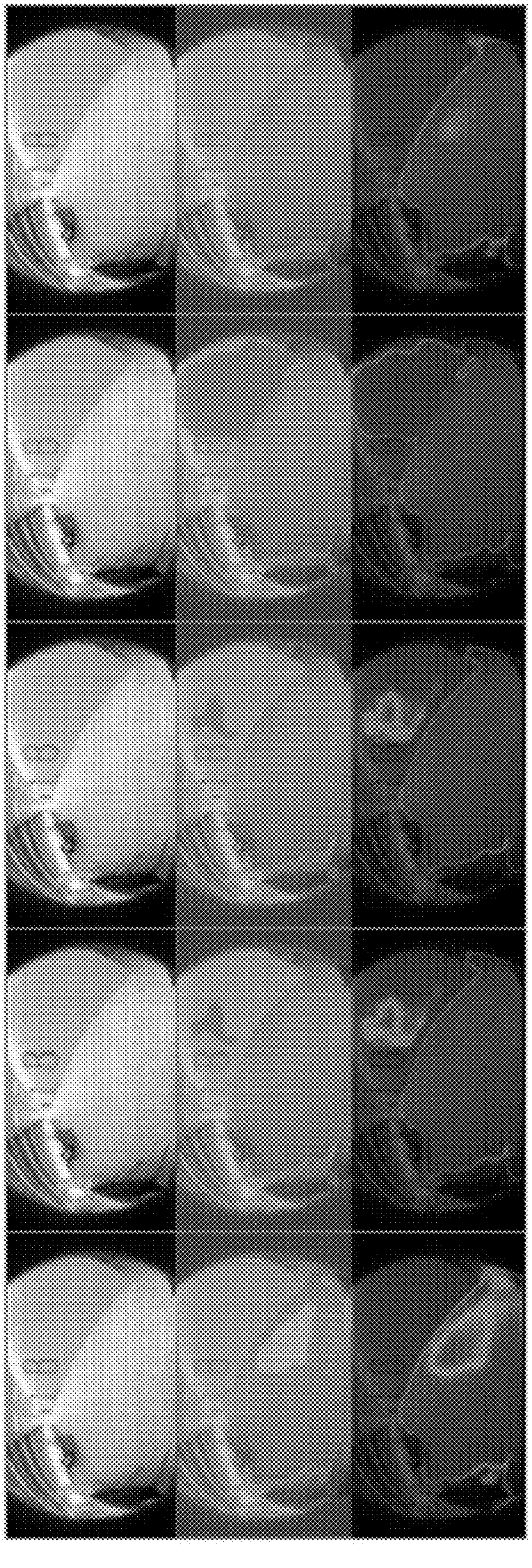
FIG. 6 includes images and segmentations from the images.

FIG. 6 includes multiple images and segmentations from the images. The top row of images are input images. The lower row of images illustrates boundaries for the class floor/free segmented from the images in the same column of the upper row. The left column involves segmentation without adaptation. The middle three columns include other image segmentation algorithms. As illustrated, these algorithms identify parts of the walls as being floor/free space. The right most column provides an illustration for image segmentation using the concepts described herein involving adaption based on minimizing entropy of each pixel. As illustrated, the concepts described herein provide for better segmentation of the floor/free space from the input images than the other segmentation algorithms of the middle three columns.

Figure 7:
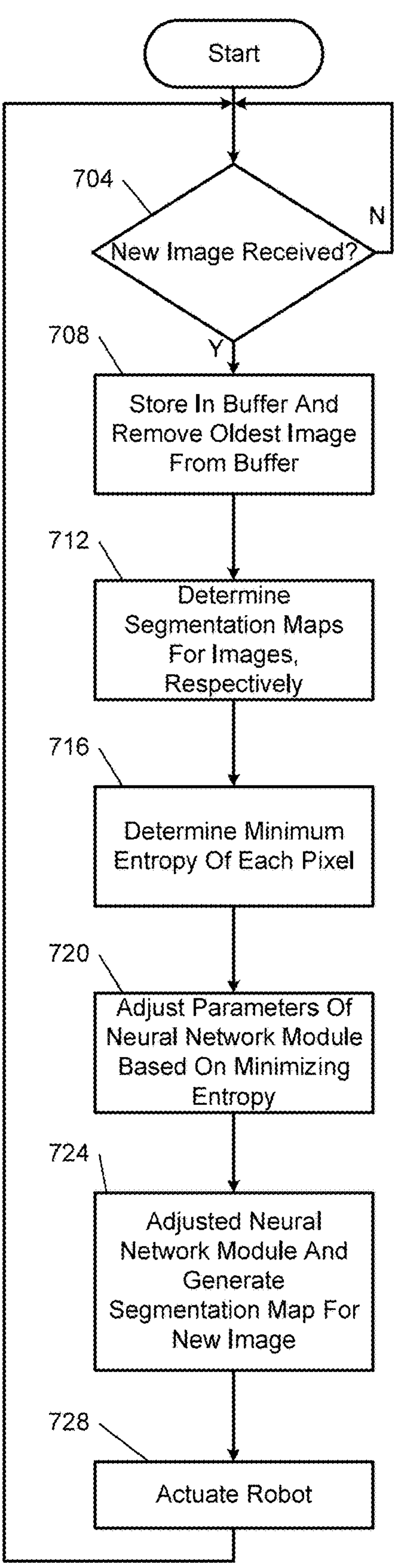
FIG. 7 is a flowchart depicting an example method of adapting the semantic segmentation module using a continuous stream of images.

FIG. 7 is a flowchart depicting an example method of adapting the semantic segmentation module 150 using a continuous stream of images. Control begins with 704 where the semantic segmentation module 150 determines whether a new image has been received. If 704 is true, control continues with 708. If 704 is false, control returns to 704.

At 708, the buffer module 408 stores the image and removes an oldest received image. The stack 404 stacks (e.g., concatenates) the image and the stored images in the buffer module 408. At 712, the neural network module 412 generates the segmentation maps for the newly received image and the images in the buffer, respectively. The segmentation maps may group pixels of the input images under respective class labels. The entropy module 418 generates the entropies as described above based on the logits determined by the logit layer 416 based on the segmentation maps.

At 716, the minimum entropy module 420 determines the minimum entropy of each pixel based on the segmentation maps. At 720, the adaptation module 424 adjusts the parameter(s) (e.g., the batch norm parameters) of the neural network module 412 based on the minimum entropies.

At 724, the neural network module 412 generates a new segmentation map for the newly received image (at 704) based on the adjusted parameter(s). At 728, the control module 120 selectively actuates one or more actuators of the robot based on the new segmentation map (e.g., classifications of one or more objects in the segmentation map). Control returns to 704 for a next image. In this manner, the neural network module 412 is continuously updated as images are received.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A semantic image segmentation (SIS) system, comprising:

a neural network module trained to generate semantic image segmentation maps based on input images, the semantic image segmentation maps grouping pixels of the input images under respective class labels, respectively;

a minimum entropy module configured to, at a first time, determine first minimum entropies of pixels, respectively, in the semantic image segmentation maps generated for a received image and N images received before the received image, where N is an integer greater than or equal to 1; and an adaptation module configured to selectively adjust parameters of the neural network module based on optimization of a loss function that minimizes the first minimum entropies.

2. The SIS system of claim 1 wherein the adaptation module is configured to adjust batch norm parameters of the neural network module based on the optimization of a loss function that minimizes the first minimum entropies.

3. The SIS system of claim 2 wherein the batch norm parameters include β and γ of each layer of the neural network module.

4. The SIS system of claim 1 wherein the neural network module includes a ResNet-50 convolutional neural network.

5. The SIS system of claim 1 wherein the neural network module includes a visual network having the Transformer architecture.

6. The SIS system of claim 1 further comprising a buffer module configured to store the N images received before the received image.

7. The SIS system of claim 6 wherein the received image and the N images received before the received image are captured consecutively in time.

8. The SIS system of claim 7 wherein the received image and the N images received before the received image are captured non-consecutively in time.

9. The SIS system of claim 1 wherein:

the minimum entropy module is configured to, at a second time after the first time, determine second minimum entropies of the pixels, respectively, in the semantic image segmentation maps generated for a second received image and N images received before the second received image; and the adaptation module is configured to selectively adjust the parameters of the neural network module based on the second minimum entropies.

10. The SIS system of claim 9 wherein the received image, the second received image, and the N images form a continuous video stream.

11. The SIS system of claim 1 wherein the neural network module is further configured to, after the adjustment of the parameters, determine a semantic image segmentation map based on the received image.

12. A robot comprising:

a camera;

the SIS system of claim 1, wherein the received image is captured using the camera; and a control module configured to actuate an actuator of the robot based on one of the semantic image segmentation maps from the neural network module.

13. The system of claim 1 wherein the neural network module is configured to receive the received image from a camera.

14. The system of claim 1 wherein the neural network module is configured to receive the received image from a video stored in memory.

15. A semantic image segmentation (SIS) method, comprising:

by a neural network module, generating semantic image segmentation maps based on input images, the semantic image segmentation maps grouping pixels of the input images under respective class labels, respectively;

at a first time, determining first minimum entropies of pixels, respectively, in the semantic image segmentation maps generated for a received image and N images received before the received image, where N is an integer greater than or equal to 1; and selectively adjusting parameters of the neural network module based on optimization of a loss function that minimizes the first minimum entropies.

16. The SIS method of claim 15 wherein the selectively adjusting includes adjusting batch norm parameters of the neural network module based on the optimization of a loss function that minimizes the first minimum entropies.

17. The SIS method of claim 16 wherein the batch norm parameters include β and γ of each layer of the neural network module.

18. The SIS method of claim 15 wherein the neural network module includes one of:

a ResNet-50 convolutional neural network; and a visual network having the Transformer architecture.

19. The SIS method of claim 15 further comprising storing the N images received before the received image in a buffer module.

20. The SIS method of claim 15 wherein one of:

the received image and the N images received before the received image are captured consecutively in time; and the received image and the N images received before the received image are captured non-consecutively in time.

21. A semantic image segmentation (SIS) method, comprising:

by a neural network module, generating semantic image segmentation maps based on input images that group pixels of the input images under respective class labels, respectively;

at a first time, determining first minimum entropies of pixels, respectively, in the semantic image segmentation maps generated for a received image and N images received before the received image, where N is an integer greater than or equal to 1; and selectively adjusting the respective class labels of the semantic image segmentation map of the received image based on a function that minimizes the first minimum entropies of the pixels.

* * * * *